INVENTOR
T. J. CHINLUND
BY Lucian C. Canepa
ATTORNEY 3,566,369
Patented Feb. 23, 1971

3,566,369

INFORMATION PROCESSING SYSTEM UTILIZING REPEATED SELECTIVE EXECUTION OF IN-LINE INSTRUCTION SETS

Thomas J. Chinlund, New York, N.Y., assignor to Bell Telephone Laboratories, Incorporated, Murray Hill and Berkeley Heights, N.J., a corporation of New York Filed May 1, 1969, Ser. No. 820,822
Int. Cl. G06f *9/00, 9/12*
U.S. Cl. 340—172.5 12 Claims

ABSTRACT OF THE DISCLOSURE

A basic selective access system as heretofore proposed is adapted to achieve repeated selective execution (looping through) of in-line instruction sets. Such operation requires that multiple registers be loaded with selection information that includes a jump-mode representation. This disclosure is directed to a modification of such a basic system. The modified system is characterized by a program-instruction-location-counter-save capability that allows the selection information required to accomplish looping to be reduced, simplified and modularized.

BACKGROUND OF THE INVENTION

(1) Field of the invention

This invention relates to the selective processing of information signals and more particularly to an improved selective access system.

(2) Description of the prior art

In one type of conventional information processing system as heretofore constructed, a subroutine is called by a main program by executing a transfer (branch) instruction to the subroutine. During the course of this process, information must be passed to the subroutine to link it to the main program. This linking information is generally of two kinds:

(I) A calling program address, usually very close to the activating transfer instruction, to which the subroutine will return control. This address is typically placed in a central processor index register.

(II) Parameters passed by the calling program to the subroutine. This passing operation is generally done in either of the following ways:

- (i) By the calling subroutine placing the information in central processor registers according to conventions "known" by the subroutine. In most cases the instructions to do this immediately precede the activating branch instruction. These parameter-loading instructions are called set-up instructions.
- (ii) By putting the parameters in line directly after the activating branch instruction. These may then be referenced by the subroutine using known offsets from the return address which has been loaded by the main program (see I above).

To save the time required for repeated calls and returns, the subroutine itself, as well as the parameters therefor, may be placed in line. (Such trades of space to replicate the subroutine for time saved on calls and returns are often made in practice.)

To take a specific example, assume that it is desired to execute repeatedly a multi-instruction subroutine B that requires appropriate parameters at the time of each call or reference thereto. Assume further that B is to be referenced three times and that on the first call two parameter-supplying or set-up instructions are required; that on the second call one set-up instruction is needed; and that on the third reference three set-up instructions are required. One conventional way of accomplishing the foregoing is represented by the program outlined below:

(1) Set-up instruction W
(2) Set-up instruction Y
(3*a*) First instruction of B
⋮
(3*n*) Last instruction of B
(4) Set-up instruction V
(5*a*) First instruction of B
⋮
(5*n*) Last instruction of B
(6) Set-up instruction V
(7) Set-up instruction X
(8) Set-up instruction Z
(9*a*) First instruction of B
⋮
(9*n*) Last instruction of B.

In accordance with the selective access mode of operation disclosed in my copending application Ser. No. 637,789, filed May 11, 1967, now Patent 3,521,237, issued July 21, 1970, sets of in-line instructions can be iteratively traversed, selecting different combinations of such instructions on each traversal. This is done by utilizing a selection information format that includes both bit-mode and jump-mode encoding. This method of operation is of advantage whenever a sequence of instructions can be arranged so that selected subsets of the sequence, executed one after the other, will perform a desired procedure. In such cases, selective access permits compacting the code by merging the subsets and having common instructions appear only once (except where the sequences of execution must be varied). As a specific illustration of such a sitaution, consider the case of repeated calls to a subroutine, where parameters must be passed to the subroutine by means of set-up instructions. Assume, further, that various subsets of the set of all possible set-up instructions for the subroutine are needed as set-up instructions on each particular call of the subroutine. Using selective access, it is possible to use the set of all set-up instructions as the sequence to be selectively accessed on each particular call of the subroutine. Further, by inserting the subroutine in-line and using the suspension-of-selective-access option described in the aforementioned copending application, it is possible to execute the subroutine itself in-line, thus saving the time and space for a call instruction. (In selective access an automatic return feature obviates, in some cases, the need for a return instruction.)

In comparison with the aforementioned conventional program, the selective access version is advantageous in several respects. Nevertheless, the latter approach does require space in memory to store four 16-bit words of selection information and time in which to load four selection registers (for the particular example described). In addition, the selective access approach is characterized by a degree of programming complexity in designing the format of the required selection information. Also, the selective access version exhibits a lack of modularity in that, if the length of the in-line instruction set or of the subroutine B is changed, the amount of the jump included in the required selection information must also be changed.

SUMMARY OF THE INVENTION

Accordingly, an object of the present invention is an improved information processing system.

More specifically, an object of this invention is an improved system of the selective access type.

Another object of the present invention is an improved selective access system in which the selection information needed to accomplish looping is reduced, simplified and modularized.

These and other objects of the present invention are realized in a specific illustrative embodiment thereof that comprises a selective access system adapted to achieve repeated execution of in-line instruction sets in an improved way. In particular, the system is modified to include a program-instruction-location-counter-save register, a program-instruction-location-counter-save flip-flop, a program-instruction-location-counter-save option decoder and a suspend-restore option decoder. When an instruction with the save option is executed, the contents of the counter are saved in the register and the save flip-flop is set. In turn, if the save flip-flop is set, the execution of an instruction with the suspend-restore option causes a change in machine mode (from or to the selective access mode). If this change is from normal mode to selective access mode, the register contents are restored to the counter provided that selective access has not terminated. If selective access has terminated, the save register contents are not restored to the counter thus causing system control to continue in normal mode after the instruction with the suspend-restore option.

It is a feature of the present invention that a selective access system include a program-instruction-location-counter-save flip-flop, a program-instruction-location-counter-save register and circuitry responsive to an instruction including a program-instruction-location-counter-save flag or other option code for setting the flip-flop and transferring to the register from the counter the address of the next instruction to be processed.

It is a further feature of this invention that a selective access system include circuitry responsive to an instruction including a suspend-restore flag or other option code for suspending the selective access mode of operation and for processing each of a subset of instructions in a normal mode.

It is another feature of the present invention that a selective access system include circuitry responsive to a subsequent instruction of the subset including a suspend-restore flag and to selective access not having been terminated for transferring the contents of the save register to the program-instruction-location counter whereby repetitive selective looping through a set of instructions can be achieved under respective control of sequences of selection information.

It is noted that the technique of combining the suspend-resume option code with the save-restore option (which is the new feature) is used only to illustrate a particular efficient encoding of the new feature. It is of course possible to separate the two, and to utilize the save-restore option by itself. Without the suspend-resume option, however, in-line code would be continuously selectively accessed, with termination of selective access the control for termination of restore, as above. Alternatively, a third possibility is to have both features, but code them independently. Distinct codes for suspend and resume, and save and restore, would be provided. This gives additional flexibility, in that restores of the counter need not coincide with resumptions of selective access. Programming clarity and reliability are also improved. This added flexibility is obtained at a cost of increased instruction code space and instruction decoder complexity.

It is also possible to implement save-restore without suspend-resume in systems where it is not desired to insert stretches of nonselectively accessed code within selectively accessed sets. This would reduce system complexity.

BRIEF DESCRIPTION OF THE DRAWING

A complete understanding of the present invention and of the above and other objects, features and advantages thereof may be gained from a consideration of the following detailed description of a specific illustrative embodiment thereof presented hereinbelow in connection with the accompanying drawing in which FIGS. 1A, 1B and 1C, when placed side by side in the particular manner indicated in FIG. 2, depict a specific illustrative selective access system made in accordance with the principles of the present invention.

DETAILED DESCRIPTION

Figure 1A:
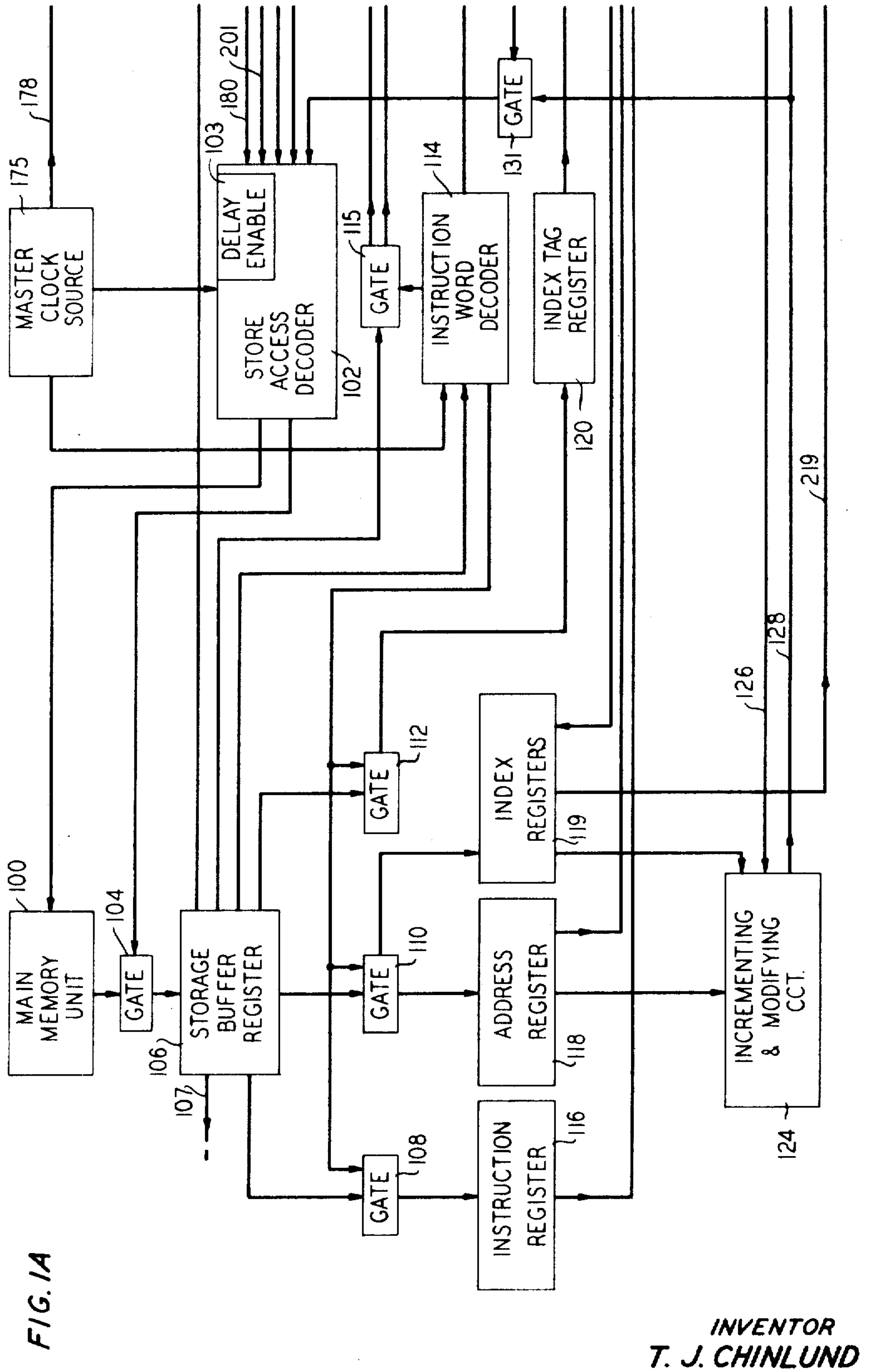
Figure 1B:
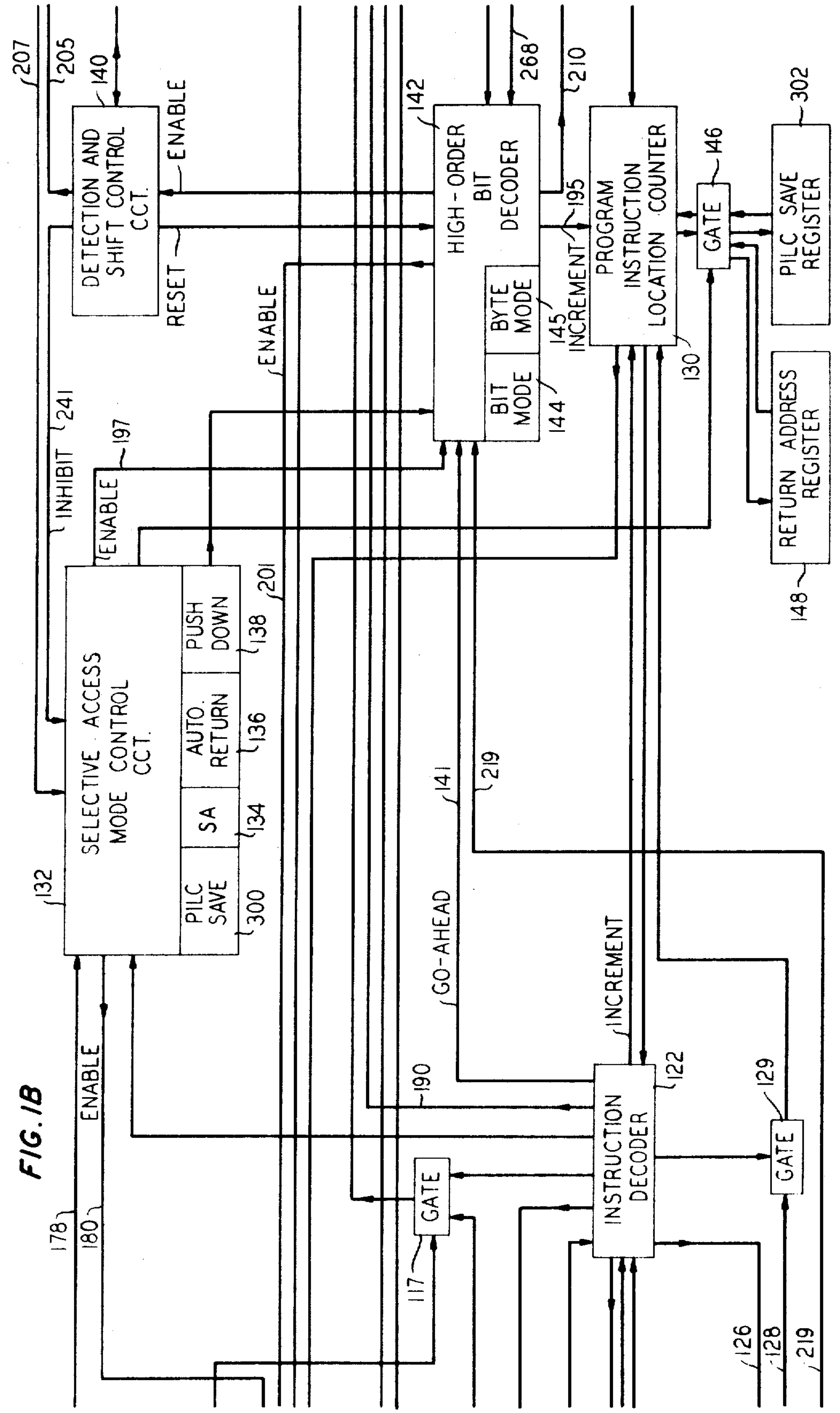
Figures 1C, 2:
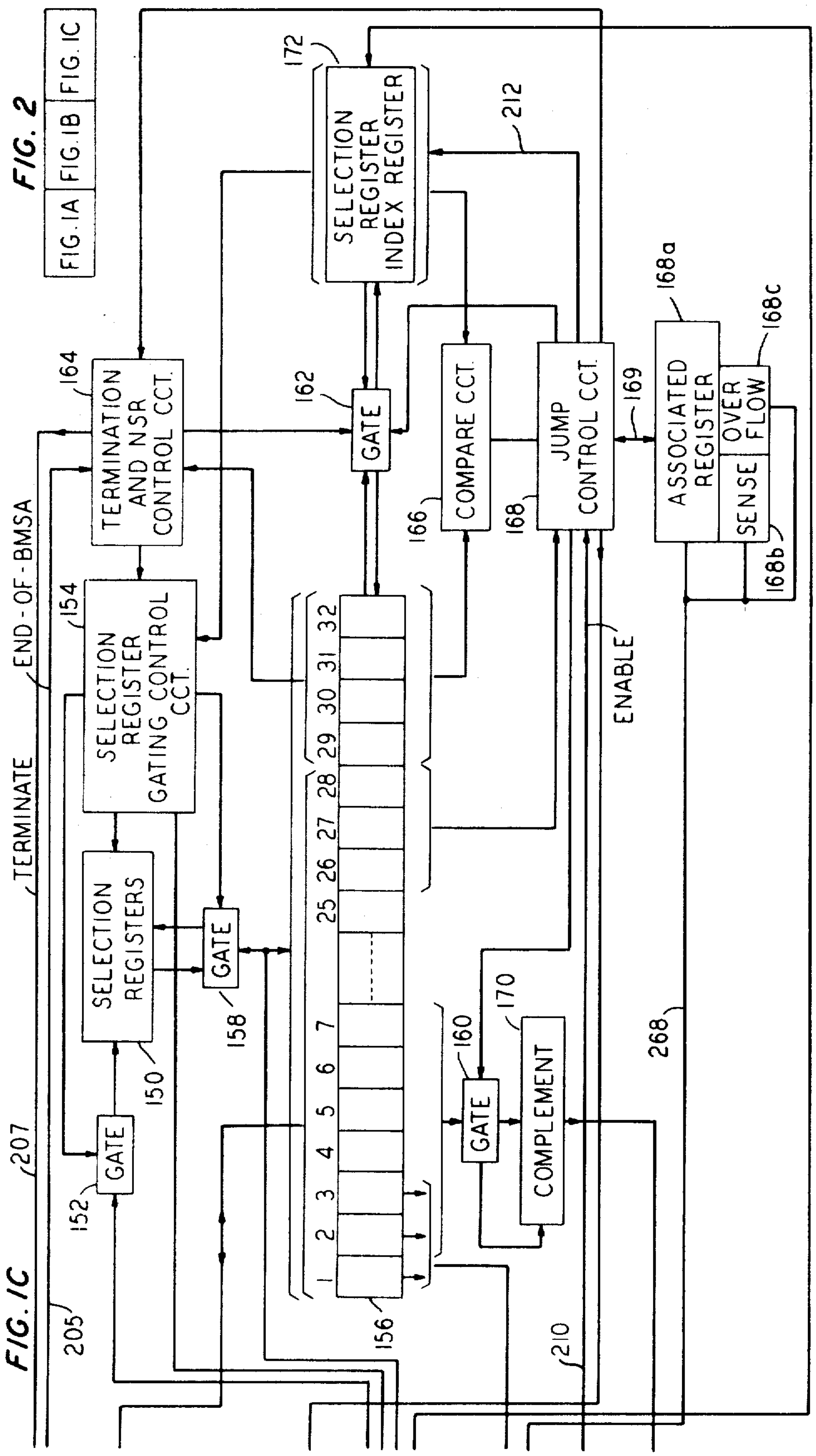

The FIG. 1A portion of the specific illustrative information processing system shown in FIGS. 1A, 1B and 1C corresponds exactly to the arrangement depicted in FIG. 1A of my afore-identified copending application.

The FIG. 1B portion of the herein-considered system is generally similar to the arrangement shown in FIG. 1B of my copending application. Corresponding elements in the two figures bear the same reference numerals. The differences between the two figures are:

(1) The instruction decoder 122 included in the present FIG. 1B has been modified to include additional decoding capabilities;

(2) The selective access mode control circuit 132 has been modified to include a program-instruction-location-counter-save flip-flop 300; and (3) A program-instruction-location-counter-save register 302 has been connected to the program-instruction-location counter 130 via the controlled gate 146.

In addition, FIG. 1C of the present drawing differs from FIG. 1C of the copending application in the respect that the controlling selection register 156 is shown herein as being a 32-stage unit rather than a 16-stage one. Also, the next-selection-register field of the selection information stored in the register 156 is represented herein as occupying only four (rather than 5) bit positions of each selection word stored in the register 156. Each of the selection registers 150 shown in FIG. 1C is also modified to be a 32-stage unit. Illustratively, the block 150 includes 15 such 32-stage registers.

To establish a context for understanding the operation and unique capabilities of the depicted embodiment of the present invention, it will be helpful to review briefly the general operation of a basic selective access system of the type disclosed in my above-identified copending application. In particular, let us consider the mode of operation of that system in carrying out the same repeated subroutine calling operation embodied in the conventional prior art program set out above.

In a selective access system such as that disclosed in my copending application, the above-specified prior art subroutine calling program can be compacted. An illustrative representation of the instructions of such a compacted program is as follows:

(1) Load selection registers 1 through 4 from TABLE and enter selective access mode using selection register No. 1
(2) Set-up instruction U
(3) Set-up instruction V
(4) Set-up instruction W
(5) Set-up instruction X
(6) Set-up instruction Y
(7) Set-up instruction Z
(8) First instruction of B, suspend selective access

⋮

($7+b$) Last instruction of B, resume selective access.

For this particular program the block of memory designated TABLE must contain the following information:

(1)

| | Bit position | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Row: | | | | | | | | | | | | | | | | |
| 1 | 1 | 1 | 1 | 0 | 1 | 0 | 1 | 0 | 1 | 1 | 1 | 0 | 0 | 1 | 0 | 0 |
| 2 | 1 | 1 | 0 | 1 | 1 | 1 | 1 | 0 | 1 | 1 | 1 | 0 | 0 | 1 | 0 | 0 |
| 3 | 1 | 1 | 0 | 1 | 0 | 1 | 0 | 1 | 1 | 1 | 1 | 0 | 0 | 0 | 0 | 0 |
| 4 | 0 | 1 | | | b+5 | | | | 0 | 0 | 1 | 0 | 0 | 0 | 0 | 1 |

In accordance with the teachings of my copending application, successive looping through a set of instructions may be accomplished by a combination of bit-mode and jump-mode information. Thus, the words in rows 1, 2 and 3 of block (1) above are bit-mode representations and the word in row No. 4 is seen to be encoded in a jump-mode format. Note that in block (1) the required jump amount in bit positions 3 through 8 of row No. 4 is for reasons of convenience represented symbolically rather than in actual binary form.

In response to instruction No. 1 above, the basic selective access system of my copending application loads selection registers 1 through 4 included in the unit 150 (FIG. 1C) with the representations in rows 1 through 4, respectively, of block (1) and enters the selective access mode of operation. The selective access system then proceeds to process instructions 2 through 7 in accordance with the selection information contained in bit positions 2 through 7 of row No. 1 of block (1). As a result thereof, only instructions 4 and 6 are selected for execution. Instructions 2, 3, 5 and 7 are skipped over. Then the "0" representation in bit position No. 8 of block (1) causes the eighth instruction to be executed. This instruction is the first instruction of subroutine B. Since selective access is suspended at this point, all *b* instructions of subroutine B will be successively executed. (If the subroutine B is short-four instructions or less-, there is no need for the indicated suspension and resumption options.) In any event, after executing instruction No. $7+b$, the basic system continues its selective-access mode of operation under control of the contents of the selection register specified in the next-selection-register field (bit positions 12 through 16) of row No. 1. Hence, the jump-mode information (namely, jump back $b+5$ addresses) contained in row No. 4 and selection register No. 4 causes the program-instruction-location counter 130 to be set to the address of instruction No. 2. Furthermore, selective access continues under control of the selection information contained in selection register No. 2 (row No. 2 above). (This occurs because the next-selection-register field of selection register No. 4 is incremented by one on each use of the information in this register, as described in my copending application.) As a result of the information contained in row No. 2, only instruction No. 3 of instructions 2 through 7 is selected for execution. Then the *b* instructions of subroutine B are again executed in sequence. Subsequently another jump back to instruction No. 2 occurs. During the third traversal through instructions 2 through 7, instructions 3, 5 and 7 are selected for execution, as specified by the selection information contained in row No. 3. Finally, the basic selective access system responds to the all-"0" next-selection-register field contained in row No. 3 to terminate the selective access mode of operation thereby to complete the herein-described looping operation.

As indicated above, the basic selective access system disclosed in my copending application enables the specific looping operation to be achieved in an advantageous manner. This manner, however, is not without some drawbacks. First, space is required in main memory to store four selection registers worth of information. In the specific illustrative system, this requires 64 bit positions of storage. In addition, the basic system requires time in which to load four selection registers. Moreover, the described operation is characterized by some degree of programming complexity in designing selection information formats. Further, the described approach is characterized by a lack of modularity in the respect that a particular backward jump must be specified in the selection information. If the length of the subroutine B is changed, the amount of the jump must also be changed. Furthermore, the jump amount must be determined, and its maximum size is limited by the available field in the selection registers.

The principles of the present invention can be understood by describing in detail the manner in which the embodiment shown in FIGS. 1A, 1B and 1C carries out the illustrative subroutine calling procedure specified above. The first instruction of a sample program for achieving that procedure is outlined below, where the periods, ., in (2) are placed to indicate the effective groups of selection information used on successive traversals in this particular example.

(1) Load the 32-stage controlling selection register 156 (FIG. 1C) with 1. 1.1101010.1011110.1010101.111111.0000 (2)

and enter selective access, save option.

The indicated 32-bit word may be included in the load instruction itself. Alternatively, the word may be stored in a selection TABLE in memory and referenced by the load instruction. In either case loading of the indicated word into the register 156 is done in a straightforward manner in accordance with the teachings contained in my copending application.

In accordance with the present invention, the load instruction set out above includes a program-instruction-location-counter-save option code. If this option code is, for example, a "1" flag, the instruction indicates in effect that the program-instruction-location-counter-save flip-flop 300 in the selective access mode control circuit 132 of FIG. 1B is to be set. More specifically, the status of the option code is interpreted by the instruction decoder 122 which responds to a "1" save option flag by signaling the circuit 132 to set the flip-flop 300. The decoder 122 also responds to the enter-selective-access portion of the load instruction to signal the circuit 132 to set the selective access flip-flop 134.

In accordance with the present invention, the save-option code may occur in any instruction, not necessarily the instruction that enters selective access. In any case the effect is as follows: the save flip-flop 300 is set and the contents of the counter 130 are gated to the register 302.

Should the save flip-flop 300 already be set, the following alternatives may take place, depending on the particular implementation: (a) The contents of the register 302 may be restored to the counter 130. The option is then a save-restore option. (b) The option may be ignored. It is then a save option only, with restoration caused either by a suspend-restore option as illustrated here, or by an independent restore option code. (c) The save flip-flop 300 may be reset, in conjunction with either (a) or (b). The option is then a save-mode option, which alternately enters and leaves save mode while accordingly saving or restoring the counter 130.

The remaining instructions of the illustrative program for achieving looping in accordance with the principles of this invention are as follows:

(2) Set-up instruction U
(3) Set-up instruction V
(4) Set-up instruction W
(5) Set-up instruction X
(6) Set-up instruction Y
(7) Set-up instruction Z
(8) First instruction of B, suspend-restore selective access option.

⋮

($7+b$) Last instruction of B, suspend-restore selective access option.

In response to instruction No. 1 above, the specified 32-bit word is loaded into the controlling selection register 156 of FIG. 1C, and the decoder 122 and the mode control circuit 132 of FIG. 1B are effective to set the flip-flops 134 and 300. In addition, the presence of the save option in instruction No. 1 causes the gate 146 to be activated by the circuit 132 to transfer the address of the next instruction (No. 2) from the counter 130 to the program-instruction-location-counter-save register 302. Selective access then commences under control of the word stored in the register 156. The first or left-most bit position of this selection code is a "1" which, in accordance with one illustrative representation, signifies a bit-mode encoding. Accordingly, the next seven bits of the selection word cause the fourth, sixth and eighth instructions above to be selected for execution. In the present program the suspend-restore option code of instruction No. 8 is, for example, a "1." The instruction decoder 122 responds to this "1" flag by signaling the mode control circuit 132 to reset the selective access flip-flop 134 and to set the pushdown flip-flop 138. This has the effect of suspending selective access operation while at the same time remembering that selective access was underway at the time the suspend-restore option was encountered. But, since selective access has only been suspended, not terminated, the set condition of the program-instruction-location-counter-save flip-flop 300 is not altered at this time.

As a result of the above-indicated suspension of the selective access mode of operation, the *b* instructions of the subroutine B are successively executed in a normal way. The last instruction of the subroutine also includes a suspend-restore option which for present purposes is assumed to be a "1." In response to this "1" signal, the instruction decoder 122 and the mode control circuit 132 interact to reset the pushdown flip-flop 138, set the selective access flip-flop 134 and, since selective access has not been terminated while the save flip-flop 300 is set, to activate the gate 146 to transfer the contents of the save register 302 back to the counter 130. The address so transferred is the address of instruction No. 2 above. In this way the system is controlled to accomplished another selective traversal of instructions 2 through 7. In the second traversal, which is controlled by the selection information contained in bit positions 9 through 14 of representation (2), only instruction No. 3 is selected for execution. Then, in response to the "0" in bit position No. 15, instruction No. 8 is again selected, selective access is suspended thereby and the first and subsequent instructions of the subroutine B are executed. After executing the *b* instructions of the subroutine B for the second time, the illustrative system shown in FIGS. 1A, 1B and 1C again causes the contents of the save register 302 to be gated to the counter 130. As before this action results from the last instruction of B including a set (i.e., a "1") suspend-restore option bit and the flip-flop 300 still being set.

Accordingly, a third selective traversal of instructions 2 through 7 occurs. In this traversal the "0" signals in bit positions 17, 19 and 21 of representation (2) cause instructions 3, 5, and 7, respectively, to be selected for execution. At this point the selection field (bit positions 2 through 28) of word (2) constitutes an all-"1" representation. (This is so because in the basic selective access system disclosed in my copending application "0" digits in the selection field are successively set to "1" after being sensed.) And, since the next-selection-register field or right-hand four digits of word (2) comprise an all-"0" representation, selective access is terminated. In response to a terminate signal from the termination and NSR control circuit 164 (FIG. 1C), the mode control circuit 132 (FIG. 1B) resets both the selective access and save flip-flops 134 and 300. Next the *b* instructions of the subroutine B are executed in the normal mode. The suspend-restore option of the first instruction of B is ineffective because selective access has terminated, flip-flops 134, 138 and 300 having been reset.

In the course of executing the last instruction of the subroutine B for the third time, the suspend-restore option of this last instruction is ineffective (because the save flip-flop 300 is at that time in its reset state) and does not cause restoration of the counter 130 to continue looping. Accordingly, no further looping of the type specified occurs. Illustratively, the next instruction to be executed will be the one (not shown) subsequent to the last instruction of B. Alternatively, the presence of a set suspend-restore option bit in the last instruction of B can be interpreted to cause system control to revert to a calling program. This is accomplished, for example, by setting the counter 130 to the contents of the return address register 148. In this case, the save flip-flop 300 would not be reset upon termination of selective access as above; instead the combination of the save flip-flop 300 being set, the automatic return flip-flop 136 being set, the selective access flip-flop 134 being reset, the pushdown flip-flop 138 also being reset, and a suspend-restore option being decoded by the decoder 122 would cause the contents of the register 138 to be gated to the counter 130. Concurrently, the flip-flop 300 would be reset. This combination would be effective only after the execution of the first instruction in normal mode; otherwise, the suspend option of that first instruction would erroneously cause automatic return. Alternatively, the restore option code would be distinct from the suspend option code.

It is possible also to use the save feature by itself to cause looping without omitting any instructions of the set to be traversed. One way to do this, using the system as it is here illustrated, is to load the controlling selection register 156 with a bit-mode selection word containing one "0" signal in the selection field for each desired traversal. Illustratively, such a load instruction occurs during selective access or itself causes the selective access mode of operation to be entered and, in addition, includes a save option. Then by placing suspend-restore options in the first and last instructions of the in-line set (as in subset B of the above example), the first instruction will, having been selected, suspend selective access. The last instruction will cause restoration of the counter 130, the first instruction will again be selected, and so on up to the last "0" in the bit-mode selection field. In this way, up to 27 traversals of the set may be made, or, in general, up to *n* traversals where *n* is the length of the selection field in the particular system used. Another way of looking at this is to say that the "set-up" instructions of the sample program would not be present at all, for this particular use of the system. To get more than 27, or *n*, traversals, the system can be modified in a straightforward way, for example to use a jump-mode encoding to decrement the jump field by one for each traversal. In this way, up to $2^{23}$ traversals, or in general $2^j$ where $j$ is the length of the integer part of the jump field, may be made. Alternatively, registers other than the selection register may be used as a loop counter.

In such ways it is possible to get additional use from the circuitry whose primary purpose is selective access.

Attention is called to the fact that instruction No. 2 (set-up instruction U) was never selected during the above-described three traversals. The instructions 2 through 7 illustrate the kind of merged set of instructions that exploit selective access systems to best advantage. It is assumed that instruction No. 2 will be selected on other selective access calls of the depicted instruction set. The saving due to merging is specfically illustrated by the fact that instruction No. 3 (set-up instruction V) is selected twice. It must be repeated explicitly in the program for the conventional system shown first above. Using selective access, it need appear only once.

It is also noted that the selective access instruction (No. 1 above) need not be in-line as shown, but can be located elsewhere and that a transfer to instruction No. 2 under selective access can be made, as discussed in my copending application. Also, any of the instructions in a selectively accessed set may be transfers or subroutine calls, with or without suspension of selective access or saving of the program-instruction-location-counter contents.

Further variations may be illustrated by noting that instruction No. 8 might be omitted in a particular selective access traversal, thus causing the remaining instructions of B to be selectively accessed. Thus, instructions with the suspend-restore option may be selected or omitted under selective access, permitting program design of considerable intricacy using these features.

Attention is also called to the fact that suspend-resume and save-restore can be independently implemented to advantage, as noted above. Also, as noted above, the options can be coded differently for suspend and resume, or for save and restore. This improves program clarity at a cost in system complexity.

Thus, in accordance with the principles of the present invention, the need for jump-mode coding in a selective access system in which in-line instruction sets are to be selectively and repeatedly executed has been eliminated. The selection information required to carry out the new mode of operation is reduced, simplified and modularized over that formerly needed in a selective access system. In the illustrative program, the required amount of selection information has been reduced from 64 to 32 bits and, as indicated, the selection information does not include a backward jump amount. For the sake of generality, the specific illustrative system shown in FIGS. 1A, 1B and 1C does include a jump mode capability (see, in particular, FIG. 1C). However, as the particular example described above demonstrates, the unique program-instruction-location-counter-save feature makes it possible to dispense with jump-mode operation for at least one specific purpose. Hence, it is feasible in some applications of practical interest to reduce system complexity by omitting the jump-mode capability altogether, while at the same time retaining and even enhancing some of the system capabilities previously attainable only by means of jump-mode operation.

It is to be understood that the above-described arrangement is only illustrative of the application of the principles of the present invention. In accordance with these principles, numerous other arrangements may be devised by those skilled in the art without departing from the spirit and scope of the invention. In particular, any of the suggested alternatives in my copending application may be introduced to advantage, depending on the intended use of the system.

What is claimed is:

1. In combination in an information processing system,
a program-instruction-location counter,
a program-instruction-location-counter-save register,
gating means interconnecting said counter and said register,
a selective access mode control circuit including a program-instruction-location-counter-save flip-flop and means for controlling said gating means to transfer information between said counter and said register,
and means responsive to an instruction containing a set program-instruction - location - counter-save option code for signaling said circuit to set said save flip-flop and to activate said controlling means to gate the contents of said counter to said register.

2. A combination as in claim 1 wherein said signaling means is responsive to said flip-flop being set and to a subsequent instruction including a set program-instruction-location-counter-save option code for activating said controlling means to gate the contents of said register to said counter.

3. A combination as in claim 2 wherein said signaling means is further responsive to said flip-flop being set and to a subsequent instruction including a set save option code for resetting said flip-flop.

4. A combination as in claim 1 wherein said signaling means is responsive to said flip-flop being set and to a subsequent instruction including a set program-instruction-location-counter restore option code for activating said controlling means to gate the contents of said register to said counter.

5. A combination as in claim 4 wherein said signaling means is further responsive to said flip-flop being set and to a subsequent instruction including a set restore option code for resetting said flip-flop.

6. A combination as in claim 1 further including means included in and connected to said mode control circuit for establishing, suspending or terminating a selective access mode of operation in said system.

7. A combination as in claim 6 wherein said signaling means is responsive to said save flip-flop being set and to the termination of the selective access mode of operation in said system for resetting said save flip-flop.

8. In combination in an information processing system,
a program-instruction-location counter,
a program-instruction-location-counter-save register,
gating means interconnecting said counter and said register,
a selective access mode control circuit including a program-instruction-location-counter-save flip-flop, a selective access flip-flop and means for controlling said gating means to transfer information between said counter and said register,
means for setting said selective access flip-flop and causing said system to function in a selective access mode of operation,
and means responsive to an instruction containing a set program-instruction - location - counter-save option code for signaling said circuit to set said save flip-flop and to activate said controlling means to gate the contents of said counter to said register.

9. A combination as in claim 8 wherein said signaling means is responsive to a subsequent instruction containing a set suspend-restore option code for signaling said circuit to temporarily suspend selective access operation whereby a subset of instructions including said subsequent instruction as the first instruction thereof is processed in a normal instruction-by-instruction manner.

10. A combination as in claim 9 wherein said signaling means is responsive to an instruction of said subset containing a set suspend-restore option code and to selective access not having been terminated for signaling said circuit to activate said controlling means to gate the contents of said register to said counter and for resuming selective access operation provided that save flip-flop is still set.

11. In combination in a system adapted to execute selected ones of a set of instructions in successive traversals of said set,
a program-instruction-location counter,
a program-instruction-location-counter-save register,
means for storing groups of selection information units, which groups respectively correspond to said traversals,
means including a save flip-flop responsive to an instruction referencing said set specifying a selective access mode of operation in accordance with said information units and containing a save-option code for setting said flip-flop and causing the address of the first instruction of said set to be transferred from said counter to said register and for processing a first subset of said instructions in accordance with the first group of selection information units contained in said word,
means responsive to the termination of the selective access mode of operation in said system for resetting said save flip-flop,
means responsive to an instruction of a second subset of said set containing a suspend-restore option code for suspending the selective access mode of operation and for processing each instruction of said second subset in a normal mode of operation,
and means responsive to a subsequent instruction of said second subset including a suspended-restore option code for causing the address stored in said save register to be transferred to said counter provided that said save flip-flop is still set whereby each subsequent traversal of said first subset of said instructions is controlled by a different group of selection information units.

12. In combination in a selective access system adapted to process a set of instruction each of which may include a program-instruction-location-counter-save option code or a suspend-restore option code or a restore option code a program-instruction-location counter, a selective-access-mode-control circuit including a selective access flip-flop, a program-instruction-location-counter-save flip-flop and a pushdown flip-flop, a program-instruction-location-counter-save register, bidirectional gate means interconnecting said program-instruction-location counter and said save register, and instruction decoder means responsive to a selective access load instruction specifying sequences of selection information for signaling said mode control circuit to set said selective access flip-flop and, if said instruction includes a program-instruction-location-counter-save option code, for signaling said mode control circuit to set said program-instruction-location-counter-save flip-flop and to activate said gate means to transfer the address of the next instruction to be processed from said program-instruction-location counter to said program-instruction-location-counter-save register, said instruction decoder means being responsive to each instruction of a subset of instructions subsequent to said load instruction that does not include a suspend-restore code or a restore code for signaling said mode circuit to control the selective processing of said subset of instructions in accordance with the first sequence of selection information specified by said load instruction, said instruction decoder means being responsive to the first selected instruction of said set that includes a suspend-restore code for signaling said mode control circuit to reset said selective access flip-flop and to set said pushdown flip-flop thereby to control said system to process each of the remaining instructions of said set in a normal mode, said instruction decoder means being responsive to an instruction of said set including a suspend-restore code and to said pushdown flip-flop and said program-instruction-location-counter-save flip-flop both being set for signaling said mode control circuit to reset said pushdown flip-flop and to set said selective access flip-flop and to activate said gate means to transfer the address stored in the program-instruction-location-counter-save register to said program-instruction-location counter whereby repetitive selective looping through said instructions referenced by the load instruction is achieved under respective control of said sequences of selection information.

References Cited

UNITED STATES PATENTS

| | | |
|---|---|---|
| 3,239,820 | 3/1966 | Logan et al. |
| 3,408,630 | 10/1968 | Packard et al. |
| 3,417,380 | 12/1968 | Hasbrouck et al. |
| 3,418,638 | 12/1968 | Anderson et al. |

GARETH D. SHAW, Primary Examiner